(No Model.)
J. B. MUNSLOW.
REEL FOR WIRE NAIL MACHINES.
No. 502,373. Patented Aug. 1, 1893.
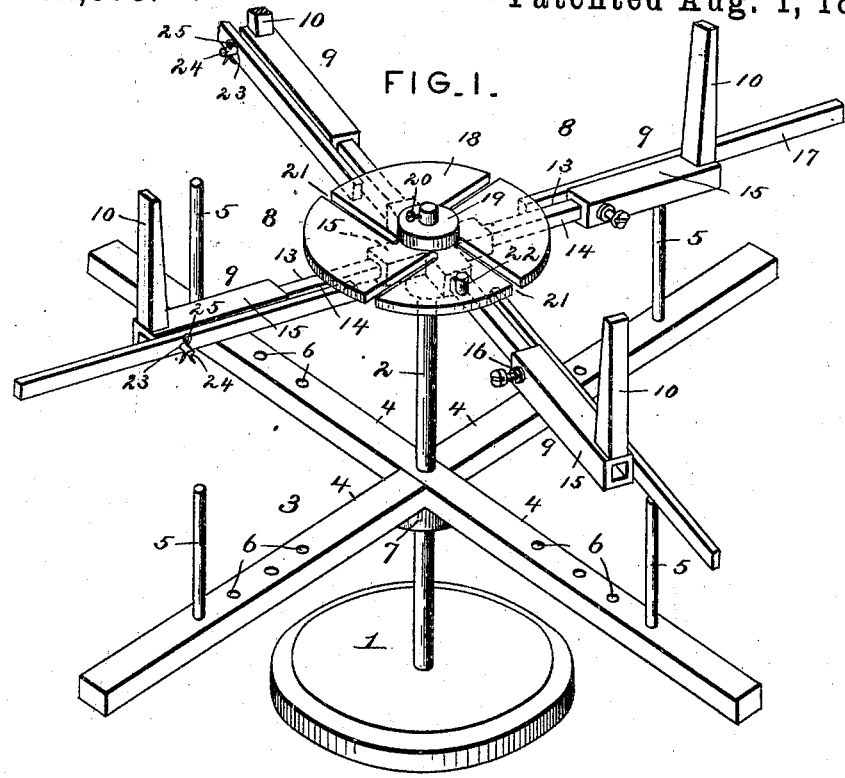
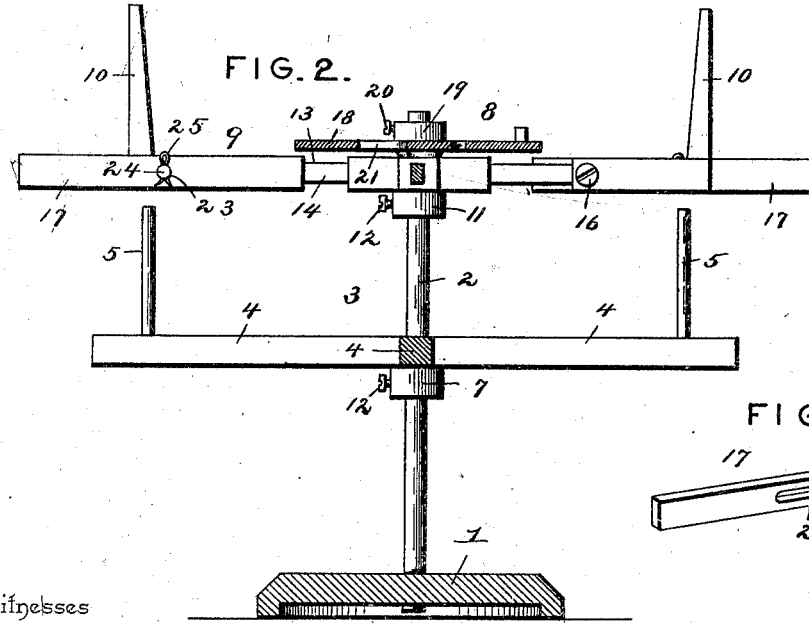
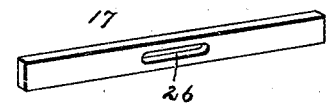
Witnesses
Harry L. Ames.
Inventor
Joseph B. Munslow.
By his Attorneys,
C. A. Snow & Co.

UNITED STATES PATENT OFFICE.

JOSEPH B. MUNSLOW, OF FINDLAY, OHIO, ASSIGNOR OF ONE-HALF TO P. B. MORRISON, OF SAME PLACE.

REEL FOR WIRE-NAIL MACHINES.

SPECIFICATION forming part of Letters Patent No. 502,373, dated August 1, 1893.

Application filed January 31, 1893. Serial No. 460,304. (No model.)

*To all whom it may concern:*

Be it known that I, JOSEPH B. MUNSLOW, a citizen of the United States, residing at Findlay, in the county of Hancock and State of Ohio, have invented a new and useful Reel for Wire-Nail Machines, of which the following is a specification.

My invention relates to improvements in reels, of the class employed in feeding wire to nail machines and the like, and it has for its object to provide a simple, durable and effective device capable of being adjusted to receive coils of different sizes.

Further objects and advantages of my invention will appear in the following description and the novel features thereof will be particularly pointed out in the appended claims.

In the drawings: Figure 1 is a perspective view of a device embodying my invention. Fig. 2 is a vertical central section of the same. Fig. 3 is a detail view of a slightly modified form of finger.

I have illustrated my invention in connection with a double reel, namely, one which is adapted to feed two wires simultaneously to the machine.

1 designates a base which is provided with a central vertical shaft 2, and 3 designates the lower reel, which is revolubly mounted upon said shaft and comprises the radial arms 4 provided near their outer ends with the adjustable uprights 5. The arms 4 are provided, each, with a series of sockets 6, in either of which sockets may be stepped the uprights. An adjustable collar 7 (like the collar 11) is slidably fitted upon the shaft beneath the reel 3, upon which the latter rests.

8 designates the upper reel, having the radial arms 9 provided at their free terminals with the uprights 10, this reel, also, being rotatively mounted upon the shaft and being capable of vertical adjustment. An adjustable collar 11 is secured by means of a set-screw 12 to the shaft beneath the reel 8, and upon which the latter rotates. The said arms 9 of the reel 8 comprise longitudinally adjustable members, the inner members 13 consisting of angular stems 14 which fit snugly in hollow or socket arms 15 which carry the integral uprights 10. The hollow or socket arms are provided with set-screws 16 which engage the stems 14 to lock the members of the arms at the desired extension. Pivotally mounted upon the sides of the arms 9, near their outer ends, are the swinging fingers 17, which, when in their horizontal positions project outward beyond the extremities of the arms to form supports for the coil of wire. Rotatively mounted upon the shaft 2, above and bearing upon the upper side of the upper reel or spider, is a clutch plate 18, which is held from vertical displacement by the superjacent collar 19, also fitted upon said shaft 2 and secured by the set-screw 20. This clutch-plate is provided with a series of slots 21, approximately radial in disposition, and corresponding in number to the fingers 17. The clutch-plate is further provided with a hand-hold 22, or similar means for turning.

The operation of my improved reel is simple and direct. The parts being arranged in the position shown in full lines in Fig. 1, with the clutch-plate turned so as to dispose its slots out of alignment with the fingers 17, and the inner ends of said fingers bearing against the under side of the clutch plate, the coil of wire is placed upon the outer arms of the fingers, surrounding the uprights 10. When the lower reel becomes empty and it is desired to drop the coil which is supported upon the upper reel, the clutch-plate is rotated sufficiently to bring its slots in alignment with the inner ends of the fingers, whereupon the outer ends of the latter are depressed by the weight of the coil. As soon as the inner ends of the fingers have been released in this way the clutch-plate is turned farther to again move its slots out of alignment with the fingers, thereby engaging the previously outer ends of the latter and holding them in a horizontal position as before. The extensible arms of the spider enable the uprights to be adjusted toward or from the center to accommodate different sizes of coils.

The fingers are provided, as shown in Figs. 1 and 2, with central openings 23 which are loosely fitted upon lateral studs 24 carried by the arms of the spider, a split key 25 being engaged in a transverse perforation in the outer end of each stud to hold the finger in place, but the opening which is formed in the finger may be elongated to form a slot 26, as shown in Fig. 3, to enable the finger to be adjusted longitudinally.

The object of providing means for the longitudinal adjustment of the fingers is to accommodate coils of greater thickness than can be supported upon the outer arms of the fingers.

Changes in the form, proportion, and minor details of construction may be resorted to without departing from the spirit or sacrificing any of the advantages of my invention.

Having thus described my invention, what I claim, and desire to secure by Letters Patent, is—

1. In a device of the class described, the combination with a vertical shaft, of a spider rotatably mounted upon said shaft and provided with radial, longitudinally extensible arms, fingers pivotally connected to the extremities of said arms, and means to hold said fingers in a horizontal position, substantially as specified.

2. In a device of the class described, the combination with a vertical shaft, of a spider having radial arms each comprising an inner stem and an outer hollow or socket portion slidably fitted upon the stem, and fingers pivotally connected to the outer ends of said arms and provided with means whereby they may be locked in their operative position, substantially as specified.

3. In a device of the class described, the combination with a vertical shaft, of a spider having radial arms provided with terminal uprights, fingers pivotally connected to the outer ends of such arms, and a rotatable clutch-plate mounted upon said shaft and provided with slots to register with the inner arms of the fingers, substantially as specified.

4. In a device of the class described, the combination with a vertical shaft, of vertically adjustable collars, slidably fitted upon said shaft and provided with means to lock them thereto, a lower reel rotatably mounted upon said shaft and bearing upon one of said collars, an upper reel mounted upon the shaft and bearing upon one of the said collars, fingers pivotally connected to the upper reel near the outer terminals of its arms, a clutch-plate rotatably mounted upon the shaft above the upper reel, and a collar slidably fitted upon the shaft above said clutch-plate, all constructed and arranged substantially as specified.

5. In a device of the class described, the combination with a vertical shaft, of a spider rotatably mounted thereupon, fingers pivotally connected to the arms of said spider near their outer terminals, means whereby said fingers may be longitudinally adjusted, and a rotatable clutch-plate to engage the inner ends of the fingers, substantially as specified.

In testimony that I claim the foregoing as my own I have hereto affixed my signature in the presence of two witnesses.

JOSEPH B. MUNSLOW.

Witnesses:
WILLIAM G. BORNE,
C. S. HOLDEN.